Sept. 10, 1935.  F. B. WALDRON  2,014,302
LEER WITH ROLLER BEDS
Filed Dec. 8, 1933   2 Sheets-Sheet 1

Inventor.
Frederic Barnes Waldron
BY
Morrison, Kennedy & Campbell
Attorneys.

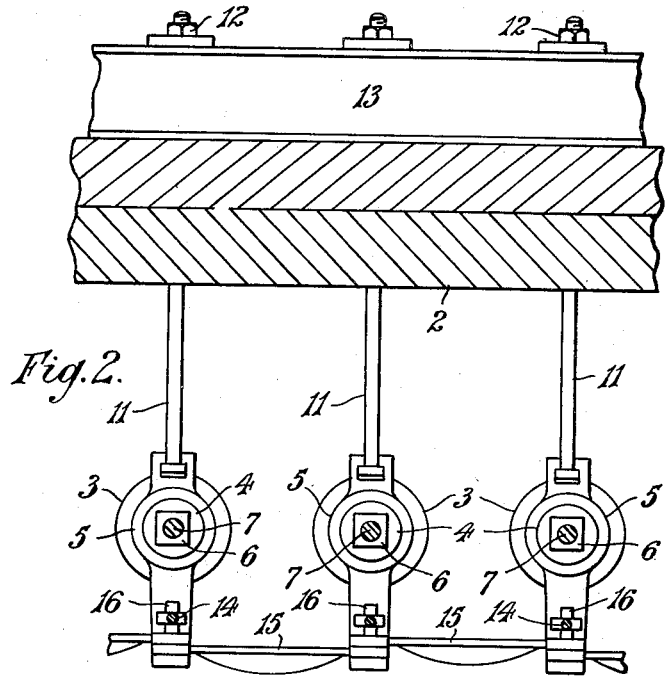
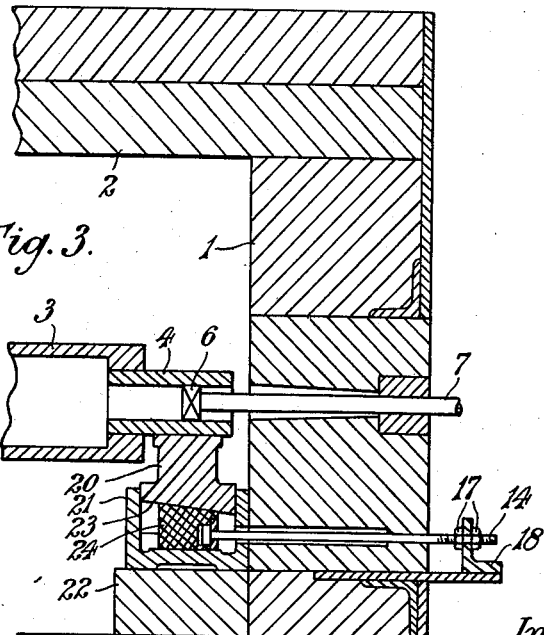

Patented Sept. 10, 1935

2,014,302

UNITED STATES PATENT OFFICE 2,014,302

LEER WITH ROLLER BEDS

Frederic Barnes Waldron, Prescot, England, assignor to Pilkington Brothers Limited, Liverpool, England, a limited-liability company of England Application December 8, 1933, Serial No. 701,469
In Great Britain December 9, 1932

4 Claims. (Cl. 263—6)

This invention relates to leers with roller beds and has for its object to diminish the loss of heat therefrom.

In leers with roller beds the rollers extend through the walls of the leer and turn in bearings outside the walls and are at one end connected with driving mechanism.

It is found that a considerable amount of heat is lost through conduction along the rollers to their bearings and their driving mechanism, and, since the roller extensions must be of substantial cross-section, in order to give sufficient stiffness, it is impossible, in the usual construction to avoid this loss.

According to the invention, the rollers terminate inside the leer and are driven from means outside the leer by flexible connections of cross section sufficient only for the driving torque and their bearings are supported either inside the leer, or, for the sake of adjustability by members passing outside the leer which are subject to tensile stresses only and so may be made of small cross section.

In the accompanying drawings:—

Figure 2 is a section along the line A—A of Figure 1, and

Figure 3 is a section similar to that of Figure 1 of an alternative construction.

Figure 1:
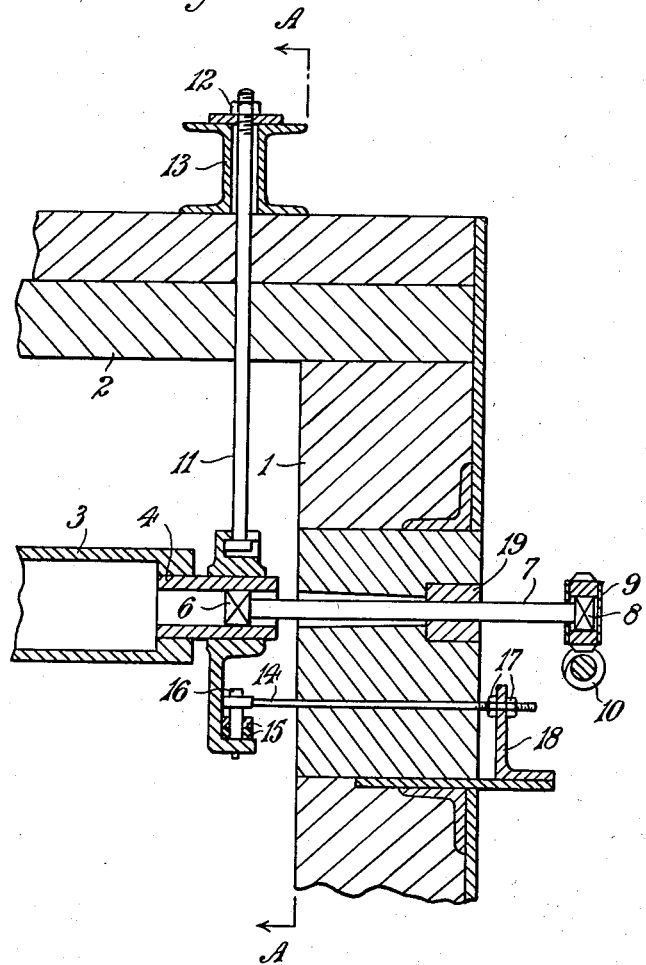
Figure 1 is a vertical cross section through part of the leer, on the centre line of one of the rollers.

Referring to Figures 1 and 2 of the drawings, 1 is one wall of the leer and 2 the roof. The rollers 3 have a bearing pin 4 at each end, which is adapted to turn in a bearing block 5. The bearing pin 4 and the block 5 are made of a heat-resisting alloy which does not oxidize at the temperature of the leer. One alloy which has been found suitable for the purpose is a nickel-chrome-steel alloy known as "nicrite". The bearing pin 4 has a square hole in which fits the square end 6 of the driving shaft 7 which passes through the wall 1 of the leer and terminates in a square end 8 fitting in a worm-wheel 9, driven by the worm 10. The bearing block 5 is suspended from the roof 2 by means of a rod 11 with adjusting nut 12 resting on a girder support 13. The rod 11 is given a cross-section sufficient to carry the weight to which the bearing block 5 is subjected, but not sufficient to give it any lateral support. The bearing block, therefore, is held against lateral movement in one direction by the rod 14 and in the direction at right angles by the bars 15 between one bearing block and the adjacent blocks. The rod 14 and the bars 15 are attached to a pin 16 fixed in the block 5. The rod 14 passes through the wall 1 and is fixed by adjusting nuts 17 to a bracket 18 supported outside the wall. The construction at the other side of the leer is similar to that described above, except that there is no driving means for the roller.

All parts of the leer are subject to considerable movement due to expansion and contraction, and the above described construction permits this movement without giving rise to strains on the supports. Thus, the roller construction can rise and fall relatively to the wall 1, while the rod 14 slides down and up on the pin 16, and the rollers can lengthen relatively to the leer fabric by the bearing pins 4 sliding endwise in the bearing blocks 5. Further, the connection by square ends 6 and 8 between the driving shaft 7 and the bearing pin 4 and the worm wheel 9 forms a flexible connection which permits displacement of the roller 3 relatively to the worm-wheel vertically and endwise. The driving shaft 7 passes through a bushing 19 of soft material such as asbestos, permitting a slight displacement of the shaft.

A tie bar 15 is omitted at intervals, leaving series of five or six rollers tied together, to allow for lengthwise expansion of the bars relative to the leer.

The position of the bearing block 5 can be adjusted vertically and endwise of the rollers, by the adjusting nuts 12 and 17, which are outside the leer. The adjustment therefore can be effected during operation of the leer and while it is hot.

The metal parts supporting the rollers 3 from outside the leer, namely, the suspending rods 11 and the rods 14, are of small cross section, adapted to resist only tensile stresses. The driving shaft 7, which is the only other part connecting the rollers with parts outside the leer, is subjected only to the driving torque, and therefore its cross section is very much less than it would be if it had to support the weight of the rollers and the glass.

In the alternative construction shown in Figure 3, in which the same reference numbers as in Figure 1 indicate similar parts, the bearing pins 4 of the rollers 3 turn in half bearings 20 carried on supports 21 resting on masonry 22 inside the leer. The bearings 20, which are adapted to slide vertically in the supports 21, have an inclined base 23, which rests on a wedge 24 adapted to slide along the inclined base 23. The wedge 24 is attached to the adjusting rod 14 of small cross section, which, as in the first described construction is held in the bracket 18 and can be adjusted by nuts 17. By means of the rod 14 and the wedge 24, the height of the bearings 20 can be adjusted from outside the leer.

In comparison with leers of the usual construction, the cross section of the metal connections from the rollers to parts outside the leer is about one-tenth of that when the roller is in external bearings.

Having described my invention, I declare that what I claim and desire to secure by Letters Patent is:—

1. A leer with roller bed of low heat loss, and comprising separately suspended bearings for the rollers located inside the leer, exterior supports located above and outside the leer, tension members or rods of small cross section connected to said exterior supports and suspending the bearings therefrom, and interior means positioning the suspended bearings in spaced relation.

2. A leer with roller bed of low heat loss, comprising bearings for the rollers located inside the leer, supports for the bearings located outside the leer, members of small cross section, subject to tensile stresses only, suspending the bearings from the said supports, and horizontal members or rods extending from the several bearings to the outside of the leer adapted to determine the location of the bearings endwise of the rollers.

3. A leer with roller bed of low heat loss, comprising bearings for the rollers located inside the leer, supports for the bearings located outside the leer, members of small cross section subject to tensile stresses only, suspending the bearings from the said supports, and horizontal members extending from each bearing to the next adjacent bearing, thus to connect a group of bearings together, while spacing them apart.

4. A leer with roller bed of low heat loss, comprising bearings for the rollers located inside the leer, supports for the bearings located outside the leer, members of small cross section subject to tensile stresses only suspending the bearings from the said supports, horizontal members extending from the bearings to the outside of the leer thus to locate the bearings endwise of the rollers, and horizontal members extending from each bearing to the next adjacent bearing connecting the bearings together in a plurality of groups, each group being independent of the next adjacent group.

FREDERIC BARNES WALDRON.